US012741427B2

(12) United States Patent
Park et al.

(10) Patent No.: US 12,741,427 B2
(45) Date of Patent: Sep. 22, 2026

(54) METHOD FOR JOINING SILICONE RUBBER USING PLASMA TREATMENT

(71) Applicant: APPLIED PLASMA INC., Gumi-si (KR)

(72) Inventors: Jae Beom Park, Gumi-si (KR); In Ho Choi, Gumi-si (KR)

(73) Assignee: APPLIED PLASMA INC., Gumi-si (KR)

( * ) Notice: Subject to any disclaimer, the term of this patent is extended or adjusted under 35 U.S.C. 154(b) by 112 days.

(21) Appl. No.: 18/725,423

(22) PCT Filed: Nov. 28, 2022

(86) PCT No.: PCT/KR2022/018990

§ 371 (c)(1),
(2) Date: Aug. 15, 2024

(87) PCT Pub. No.: WO2023/128316

PCT Pub. Date: Jul. 6, 2023

(65) Prior Publication Data

US 2025/0065573 A1 Feb. 27, 2025

(30) Foreign Application Priority Data

Dec. 30, 2021 (KR) ........................ 10-2021-0192691

(51) Int. Cl.
*B29C 65/48* (2006.01)
*B29C 65/00* (2006.01)
*B29K 83/00* (2006.01)

(52) U.S. Cl.
CPC .............. *B29C 65/48* (2013.01); *B29C 66/71* (2013.01); *B29K 2083/00* (2013.01)

(58) Field of Classification Search
CPC ......... B29C 65/48; B29C 66/71; B29C 66/43; B29C 66/7352; B29C 66/919; B29C 66/929; B29C 66/028; B29C 66/1142; B29C 2059/145; B29C 59/14; B29K 2083/00; B29K 2995/0092; C09J 5/02;
(Continued)

(56) References Cited

U.S. PATENT DOCUMENTS

2010/0132476 A1* 6/2010 Cheng ...................... G01B 7/18
29/621.1

FOREIGN PATENT DOCUMENTS

KR 1020050070410 7/2005
KR 1020050100904 10/2005
(Continued)

OTHER PUBLICATIONS

Jofre-Reche et al., "Surface Treatment of Polydimethylsiloxane (PDMS) with Atmospheric Pressure Rotating Plasma Jet", Plasma Process. Polym., 13, pp. 459-469, 2016. (Year: 2016).*
(Continued)

*Primary Examiner* — Christopher W Raimund
(74) *Attorney, Agent, or Firm* — DINSMORE & SHOHL LLP

(57) ABSTRACT

The present invention relates to a method of joining silicone rubber using plasma treatment, and more specifically, it is characterized in that one surface of the silicone rubber is modified to be hydrophilic by plasma treatment, and the silicone rubber is joined to each other using the surface-modified portion.

10 Claims, 1 Drawing Sheet

(58) Field of Classification Search
CPC .. C09J 2483/006; C09J 2483/008; C08J 5/12; C08J 2383/04
See application file for complete search history.

(56) References Cited

FOREIGN PATENT DOCUMENTS

| | | | |
|---|---|---|---|
| KR | 100600497 B1 * | 7/2006 | ......... E05B 27/0017 |
| KR | 1020200091166 | 7/2020 | |

OTHER PUBLICATIONS

Aadim et al., "Influence of Gas Flow Rate on Plasma Parameters Produced by Plasma Jet", IOP Conf. Series: Materials Science and Engineering, 987, 2020. (Year: 2020).*
Dongxu et al., "Analysis of Plasma Bonding process and Effect for PDMS", Mach, Sci. & Tech. for Aerospace Eng., Vo. 37, No. 5, May 2018. (Year: 2018).*
Korean Office Action in reference to Korean Application No. 10-2021-0192691 filed Dec. 30, 2021.

* cited by examiner

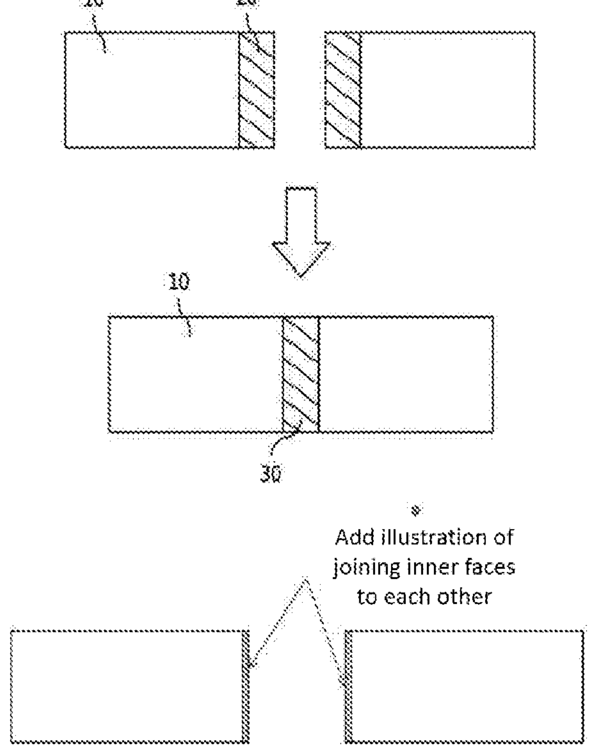
10
20
10
30
Add illustration of
joining inner faces
to each other

METHOD FOR JOINING SILICONE RUBBER USING PLASMA TREATMENT

CROSS REFERENCE TO RELATED APPLICATIONS

This application is a § 371 U.S. National Stage Application of International Application No. PCT/KR2022/018990, filed Nov. 28, 2022, and claims priority to KR 10-2021-0192691, filed Dec. 30, 2021, the entire contents of which are incorporated herein by reference.

TECHNICAL FIELD

The invention relates to a method of joining silicone rubber using plasma treatment, and more specifically, it is characterized by the fact which the one surface of the silicone rubber is treated with hydrophilicity by plasma treating the surface of the silicone rubber, and the silicone rubber and silicone rubber are joined using the surface-modified site.

BACKGROUND ART

Recently, with the rapid development of high-tech industries, the development of new materials that require excellent chemical stability is being actively developed.

As a material similar to rubber among new materials, unlike other organic materials (rubber, plastic, etc.), silicone rubber which is a high-performance industry material is widely used than any other type of elastic body due to the advantages such as high temperature stability, low temperature stability, pyroelectricity insulating, flame-resistance, tasteless-nontoxic, permanent invariability, global environmental, medicine resistance, chemical resistance, ultraviolet radiation resistance, biochemical inactivation, transparency, various mechanical characteristics.

That is, the silicon rubber is used in various silicone rubber joints such as the automatic external component joint coating, clothing shoe joints, wires manufacturing, medical device manufacturing, telegraph protection film, and consumer goods manufacturing due to the above advantages.

However, such silicone rubber is made of hydrophobicity, such as most polymer compounds, and has a disadvantage in which the adhesion with other materials is also difficult due to the adhesion between silicone rubber due to low surface energy and the like. Therefore, in order to join the silicone rubber together, special adhesive is commonly used or heat fusion method is used.

However, as described above, when using a special attachment agent, it is not eco-friendly because it uses a separate adhesive, and when using a thermal fusion method, it may damage the product, which may cause various problems, such as the shape of the silicon rubber and great energy consumption.

Accordingly, the invention was completed by studying the present invention to solve the above problems, and discovering that the polarity is formed on the surface of the hydrophobicity, and the adhesion with silicone rubber may be carried out smoothly when plasma treatment is performed on the surface of silicone rubber.

In this regard, Korea Patent No. 10-1330149 discloses an adhesive for silicone rubber adhesive.

SUMMARY OF THE INVENTION

Technical Problem

The present invention was developed to solve the problems of the prior art described above, and its purpose is to provide a method for surface modification of silicone rubber using plasma treatment.

Additionally, another object of the present invention is to provide a method for joining the surface-modified silicone rubber.

Other detailed purposes of the present invention will be clearly figured out and understood by experts or researchers in this technical field through the detailed contents described below.

Means for Solving the Problem

As a technical means to achieve the above-mentioned technical task, one aspect of the present invention comprises:

a step of plasma treating one surface of silicone rubber, wherein the plasma treatment provides a surface modification method of silicone rubber, which is performed at a plasma temperature of less than 300° C. at 1 atm. Or may be performed at atmospheric pressure and room temperature.

The silicone rubber is in the form of a sheet, and the thickness of the silicone rubber sheet may be 0.1 T to 5 T or more. Alternatively, the thickness of the silicone rubber sheet may range from 0.1 um to 150 mm.

The gas used in the plasma treatment may be air, oxygen ($O^2$), or carbon dioxide ($CO^2$).

When air is used in the plasma treatment, the supply flow rate of the air is 1 L/Wh and 10 L/Wh, and when carbon dioxide ($CO^2$) is used, the supply flow rate of the carbon dioxide ($CO^2$) may be 1 L/Wh to 3 L/Wh.

When air is used in the plasma treatment, the output of the plasma is 0.05 WATT/mm$^2$ to 0.8 WATT/mm$^2$, and when carbon dioxide ($CO^2$) is used, the output of the plasma is 0.15 WATT/mm$^2$ to 0.5 WATT/mmm$^2$.

The discharge frequency of the plasma may be 1 khz to 27.12 Mhz.

The plasma treatment interval may be 1 mm to 50 mm.

The plasma treatment energy may be 0.05 WATT/mm$^2$ to 0.8 WATT/mm$^2$.

The surface energy of the surface-modified silicone rubber for water may be increased by 10 mN/m to 60 mN/m compared to the surface energy before surface treatment.

In addition, another aspect of the present invention, provides a method of joining silicone rubber, which includes a step of joining silicone rubber, one surface of which has been surface-modified through the above method, with another silicone rubber.

The compression may be performed for 0.1 to 60 seconds at a pressure of 0.1 kg/cm$^2$ to 10 kg/cm$^2$ for bubble strength.

Meanwhile, the present specifications should not be interpreted in a usual or dictionary sense of terms and words used in the patent registration claim, and based on the principle that the inventor may describe his invention as the best way, it should be interpreted as the meaning and concept that meets the technical thought of the present invention based on the principle that it may properly define the concept of terms.

Therefore, since the embodiments described herein and the configuration shown in the drawing are only one of the most preferred embodiments of the present invention, and not representing all the technical ideas of the present invention, it should be understood that there may be various equal and variation examples that may replace them at the time of this application.

Effects of the Invention

When the surface of the silicone rubber is modified using the plasma treatment according to the present invention, and the adhesive between the silicon rubber using the modified surface, it may be environmentally friendly because it may show excellent adhesive performance without using a separate adhesive.

This may also be very efficient because there is no damage to the silicon rubber itself and may be adhered more easily.

Other effects of the present invention will be readily apparent and understood by experts or researchers in the technical field through the specific details described below or during the process of implementing the present invention.

BRIEF DESCRIPTION OF THE DRAWINGS

FIG. 1 is a schematic diagram showing the surface modification of the silicone rubber according to one embodiment of the present invention and an adhesive process thereof.

DETAILED DESCRIPTION OF THE EMBODIMENTS

Hereinafter, the present invention will be described in more detail. However, the present invention may be implemented in various different forms, the present invention is not limited to the embodiments described herein, and the present invention is only defined by the claims to be described later.

Additionally, the terms used in the present invention are only used to describe specific embodiments and are not intended to limit the present invention. Singular expressions include a plurality of expressions unless the context clearly dictates otherwise. In the entire specification of the present invention, 'including' a certain element means that other elements may be further included rather than excluding other elements, unless specifically stated to the contrary.

A first aspect of the present application provides a surface modification method of silicone rubber, comprising a step of plasma treating one surface of silicone rubber, wherein the plasma treatment is performed at atmospheric pressure and room temperature. Or may be performed at a plasma temperature of less than 300° C. at 1 atm.

Hereinafter, the surface modification method of silicone rubber according to the first aspect of the present application will be described in detail.

In one embodiment of the present application, the silicone rubber may be in the form of a sheet. That is, as shown in FIG. 1, it may have a certain thickness and length, and the thickness of the silicone rubber sheet may be about 0.1 T to 5 T, and according to one embodiment of the present invention, it may be about 1 T.

Meanwhile, the length of the silicone rubber sheet is not greatly limited, and may be used by adopting a length appropriate for the field to be applied. Additionally, the material of the silicone rubber is not particularly limited, and commonly used silicone rubber sheets may be used.

In one embodiment of the present application, the plasma treatment may be performed by blowing a constant reaction gas under the application of voltage using a low-temperature/atmospheric pressure plasma surface treatment device capable of surface treatment at the peripheral temperature of the room temperature.

In one embodiment of the present application, the surface modification method of silicone rubber may include a step of plasma treating one surface of the silicone rubber. In other words, joining to another silicone rubber may be performed using one surface of the plasma-treated silicone rubber. However, the silicone rubber should not be interpreted as limited to plasma treatment of only one surface, and when silicone rubber must be joined to both surfaces as necessary, it should be understood that the other surface is also plasma treated.

In one embodiment of the present application, gas used in the plasma treatment may be air or carbon dioxide ($CO^2$). At this time, the air may mean atmospheric air containing oxygen. Meanwhile, the air or carbon dioxide may be a high-purity gas with a purity of 99% or more, and preferably may have a purity of about 99.9%.

In one embodiment of the present application, when air is used in the plasma treatment, the supply flow rate of the air may be 1 L/Wh to 10 L/Wh, preferably 3 L/Wh to 5 L/Wh according to one embodiment of the present invention. Meanwhile, when the supply flow of the air is less than 1 L/Wh, the surface modification of the silicone rubber may not be performed smoothly because the content of the air supplied is low, and when it is more than 10 L/Wh, it may be non-economical because it exceeds the content of the air required for surface modification.

In one embodiment of the present application, when air is used in the plasma treatment, the output of the plasma (applied voltage when generating the plasma) may be 0.05 WATT/$mm^2$ to 0.8 WATT/$mm^2$, and the best range may be 0.25 WATT/$mm^2$ to 0.4 WATT/$mm^2$.

Meanwhile, according to one embodiment of the present invention, when air is used for the plasma treatment, the output of the plasma may be 0.25 WATT/$mm^2$ to 0.4 WATT/mm. When the output of the plasma is less than 0.05 WATT/$mm^2$, the applied voltage may not be performed smoothly, so that the plasma processing may not be performed smoothly, and when it is over 0.8 WATT/$mm^2$, it may be non-economical because it has already exceeded the required voltage. On the other hand, as the applied voltage when generating the plasma increases, the discharge density may increase and the development of the active functional group on the surface of the silicone rubber increases, so that the adhesive force may be improved.

In one embodiment of the present application, when carbon dioxide ($CO^2$) is used in the plasma treatment, the supply flow rate of carbon dioxide ($CO^2$) may be 1 L/Wh to 3 L/Wh, and the best range is 2 L/Wh to 3 L/Wh, and according to one embodiment of the present invention, it may be 2 L/Wh to 2.5 L/Wh.

On the other hand, when the supply flow rate of carbon dioxide ($CO^2$) is less than 1 L/Wh, the surface modification of silicone rubber may not be performed smoothly because the content of carbon dioxide supplied is small, and when it is more than 3 L/Wh, it may be non-economical because it exceeds the content of carbon dioxide required for surface modification.

In one embodiment of the present application, when carbon dioxide ($CO^2$) is used in the plasma treatment, the output of the plasma (applied voltage when generating plasma) may be 0.15 WATT/$mm^2$ to 0.5 WATT/$mm^2$, the best range. may be 0.25 WATT/mm or 0.4 WATT/mm.

Meanwhile, according to one embodiment of the present invention, when carbon dioxide is used in the plasma treatment, the output of the plasma may be 0.25 WATT/$mm^2$ to 0.4 WATT/mm. When the output of the plasma is less than 0.1 WATT/$mm^2$, the applied voltage may not be performed smoothly and the plasma treatment may not be performed smoothly. When the output of the plasma is more than 0.5 WATT/$mm^2$, it may be uneconomical because the required applied voltage has already been exceeded. Meanwhile, as the applied voltage when generating the plasma increases, the degree of discharge extinction increases, and the adhesion may be improved as the development of active functional groups on the surface of the silicone rubber increases.

In one embodiment of the present application, the discharge frequency of the plasma may be 1 khz to 27.12 Mhz. Specifically, the discharge frequency refers to the frequency of the low-temperature/atmospheric pressure plasma surface treatment device, and RF frequency may be applied. At this time, the discharge frequency of the plasma may be about 30 khz to 60 khz according to an embodiment of the present invention. Meanwhile, the transformer of the plasma surface treatment device may also use RF power.

In one embodiment of the present application, the plasma treatment energy may be 0.05 WATT/$mm^2$ to 0.8 WATT/mm. The best range may be 0.25 WATT/$mm^2$ to 0.4 WATT/$mm^2$. According to one embodiment of the present invention, it may be about 0.4 WATT/$mm^2$. Meanwhile, it may be desirable to perform the plasma treatment once within the above speed range. When the plasma treatment energy is less than 0.05 WATT/$mm^2$, the energy is too low and surface modification may not be performed smoothly, and when it is more than 0.8 WATT/$mm^2$, it may be inefficient.

In one embodiment of the present application, the plasma treatment interval may be 1 mm to 50 mm, preferably 1 mm to 20 mm, and according to an embodiment of the present invention, may be about 10 mm. At this time, the plasma treatment interval may mean the interval between one surface of the silicone rubber and the reaction gas that is the plasma source. Meanwhile, when the plasma treatment interval is less than 1 mm or more than 50 mm, the interval between one surface of the silicone rubber and the reaction gas, which is the plasma source, is too narrow or too far, causing the problem that surface modification of the silicone rubber due to plasma is not performed smoothly.

In one embodiment of the present application, the surface energy of the surface-modified silicone rubber with respect to water may be increased by more than 10 mN/m compared to the surface energy before surface treatment.

At this time, the surface contact angle may specifically mean the contact angle on one surface of the surface-modified silicone rubber.

That is, the surface of silicone rubber is originally composed of silicon (Si) and hydrocarbons, so it has hydrophobic properties, or radicals are generated in silicon (Si) or hydrocarbons ($CH_2$, etc.) when performing plasma treatment on the surface, and the radicals recombine with oxygen groups to introduce polar groups such as hydroxy groups (—OH) or carbonyl groups (—C═O—), so it has hydrophilic properties.

Therefore, one surface of the surface-modified silicone rubber, which has hydrophilic properties, may have a low contact angle with water as described above.

The second aspect of the present application, provides a method of joining silicone rubber, including a step of compressing and joining silicone rubber, one surface of which has been surface-modified, with another silicone rubber through the method according to the first aspect of the present application.

Detailed description of parts overlapping with the first aspect of the present application has been omitted, but the content described in the first aspect of the present application may be applied equally even if the description is omitted in the second aspect.

Hereinafter, the joining method of the silicone rubber according to the second aspect of the present application will be described in detail.

In one embodiment of the present application, the joining of the silicone rubber may be joining two or more silicone rubbers. In this case, each surface of the silicone rubber to be joined may have been surface-modified through the method according to the first aspect of the present application, or only one of the silicone rubber surfaces may have been surface-modified. That is, FIG. 1 only shows the process of joining two silicone rubbers, but it should be understood that other silicone rubbers may be joined to other surfaces as well, and in this case, it should be understood that at least one of each surface has been surface-modified according to the first aspect of the present application.

In one embodiment of the present application, the compression may be performed at a pressure of 0.1 kg/$cm^2$ to 10 kg/$cm^2$, and preferably may be performed at a pressure of 0.1 kg/$cm^2$ to 5 kg/$cm^2$, of the present invention, and according to one embodiment of the present invention, it may be performed at a pressure of about 1 kg/$cm^2$. Meanwhile, when the compression is performed at a pressure of less than 0.1 kg/$cm^2$, the joining between the silicone rubbers may not be performed smoothly because the pressure is too small, and when the compression is performed at a pressure of more than 10 kg/$cm^2$, the problem of deforming the silicone rubber may occur because the pressure is too large.

In one embodiment of the present application, the compression may be performed for 1 second to 60 seconds, preferably for 1 second to 20 seconds, and more preferably for 1 second to 10 seconds. Meanwhile, according to one embodiment of the present invention, it may be performed for about 5 seconds. When the compression is performed for less than 1 second, the joining between silicone rubber may not be achieved smoothly because the compression time is too short, and when it is performed for more than 60 seconds, it is inefficient because the time for joining has already been exceeded.

In one embodiment of the present application, the silicone rubber joined through the joining method of the silicone rubber may have a cutting strength of about 300 times or more compared to the cutting strength of the silicone rubber before joining.

More specifically, the cutting strength of the silicone rubber before joining may be less than about 0.5 kgf/$cm^2$, but as shown in FIG. 1, when two pieces of silicone rubber are joined, the cutting strength of the joined silicone rubber may be about 30 kgf/$cm^2$ or more.

Therefore, due to the excellent physical properties of the silicone rubber joined by the above method, it may be applied in a variety of silicone rubber joining fields, such as joining coating of exterior parts in automobiles, joining of clothing and shoes, manufacturing of electric wires, manufacturing of medical devices, protective film for telephone poles, and manufacturing of consumer goods.

Hereinafter, embodiments of the present invention will be described in detail so that those skilled with ordinary knowledge in the technical field to which the present invention pertains may easily practice it. However, the present invention may be implemented in many different forms and is not limited to the embodiments described herein.

Manufacturing Example 1. Surface Modification of Silicone Rubber Using Air (Output: 500 W)

A regular silicone sheet with a size of 50 mm×50 mm and a thickness of 1 T was prepared.

Plasma treatment was performed on one surface of the prepared silicon sheet under the following conditions.

Ambient temperature: room temperature

Plasma temperature: less than 60° C.

Used gas:air (clean dry air, CDA)

Gas supply flow rate: 4 L/Wh~5.5 L/Wh

Plasma method: Atmospheric pressure plasma

Discharge frequency: 30 khz to 27.12 Mhz

Output: 500 W

Plasma energy: 0.25 WATT/mm$^2$

Plasma treatment interval: 10 mm

Manufacturing Example 2. Surface Modification of Silicone Rubber Using Air (Output: 1,000 W)

Surface modification of silicone rubber was performed in the same manner as in Manufacturing Example 1, except that the output was set to 1,000 W.

Manufacturing Example 3. Surface Modification of Silicone Rubber Using Carbon Dioxide (Output: 550 W)

Surface modification of silicone rubber was performed in the same manner as in Manufacturing Example 1, except that carbon dioxide ($CO^2$) was used as the gas, the gas supply flow rate was set to 1 L/Wh to 2 L/Wh, and the output was set to 550 W.

Manufacturing Example 4. Surface Modification of Silicone Rubber Using Carbon Dioxide (Output: 800 W)

Surface modification of silicone rubber was performed in the same manner as in Manufacturing Example 3, except that the output was set to 800 W.

Embodiment. Joining of Silicone Rubber Sheets

The surface-modified silicone rubber sheets in Manufacturing Examples 1 to 4 were joined to each other. That is, for example, the silicone rubber sheet surface-modified in Manufacturing Example 1 was joined to the silicone rubber sheet surface-modified in the same method (method of Manufacturing Example 1), and each silicone rubber surface-modified according to Manufacturing Examples 2 to 4 was also joined in the same way.

At this time, the compression pressure between the silicone rubbers was 1 kg/cm$^2$, the compression time was 5 seconds, and after compression, it was left in atmospheric pressure conditions for 60 seconds.

Experimental Example 1. Contact Angle Measurement Experiment

The contact angle with water was measured for each surface of the silicone rubber surface-modified in Manufacturing Examples 1 to 4, and is shown in Table 1 below.

TABLE 1

| Division | ( ) | | Contact angle after plasma treatment (degrees) | |
|---|---|---|---|---|
| Manufacturing Example 1 | 94, 93, 86 | | less than 5 (not measurable) | |
| Manufacturing Example 2 | | | less than 5 (not measurable) | |
| Manufacturing Example 3 | | | less than 5 (not measurable) | |
| Manufacturing Example 4 | | 40 | 61 | 29 |

As shown in Table 1 above, the contact angle of the silicon sheet before plasma treatment was measured at about 90 degrees as a result of three measurements, confirming that it has hydrophobic properties. However, in the case of Manufacturing Examples 1 to 3, the contact angle after plasma treatment was measured to be less than 5 degrees, confirming that the surface was modified with excellent hydrophilic properties, and in the case of Manufacturing Example 4, the contact angle was measured to be less than about 60 degrees as a result of three measurements, confirming that the surface was modified to have same hydrophilic properties.

Experimental Example 2. Cutting Strength Measurement Test

The cutting strength of the silicone rubber sheet before joining and the cutting strength of the joined silicone rubber sheet according to the above example were measured and shown in Table 2 below.

TABLE 2

| Division | cutting strength of the silicone rubber sheet before joining (kgf/cm$^2$) | cutting strength of the joined silicone rubber sheet (kgf/cm$^2$) |
|---|---|---|
| Example | less than 0.5 (not measurable) | 30 or more |

As shown in Table 2, the cutting strength of the silicone sheet before joining showed a low strength value of less than 0.5 kgf/cm$^2$, while the cutting strength of the joined silicone sheet according to the embodiment of the present invention was a high strength of 30 kgf/cm$^2$ or more. By showing the values, it was confirmed that it had excellent cutting strength. Therefore, it was confirmed that when the silicone rubber sheet surface-modified according to the present invention is joined, it has excellent physical properties and may be usefully used in various industrial fields.

Above, the present invention has been described in detail along with preferred embodiments with reference to the drawings, but the scope of the technical idea of the present invention is not limited to these drawings and examples. Accordingly, various modifications or equivalent embodiments may exist within the scope of the technical idea of the present invention. Therefore, the scope of rights of the technical idea according to the present invention should be interpreted in accordance with the claims, and technical ideas that are equivalent or within the equivalent scope should be interpreted as falling within the scope of the rights of the present invention.

What is claimed is:

1. A method for bonding silicone rubber, comprising:

plasma treating a surface of a first silicone rubber sheet and a surface of a second silicone rubber sheet using air as a reaction gas at 1 atm and at a plasma temperature of less than 300° C., wherein the air is supplied at 1 L/Wh to 10 L/Wh, and wherein an output of the plasma is 0.05 WATT/$mm^2$ to 0.8 WATT/$mm^2$; and directly bonding the plasma treated surfaces of the first and second silicone rubber sheets to each other by compression at a pressure of from 0.1 kg/$cm^2$ to about 1 kg/$cm^2$ for 1 to 60 seconds, wherein no adhesive agent is applied between the plasma treated surfaces of the first and second silicone rubber sheets.

2. The method of claim 1, wherein the first and second silicone rubber sheets have a thickness of 0.1 μm to 150 mm.

3. The method of claim 1, wherein a discharge frequency of the plasma is 1 khz to 27.12 Mhz.

4. The method of claim 1, wherein the plasma treatment has an interval of 1 mm to 50 mm.

5. The method of claim 1, wherein the plasma treated surface of the first silicone rubber sheet is surface-modified and has a surface energy against water that is 10 mN/m to 60 mN/m higher than the surface energy against water before the plasma treatment.

6. A method for bonding silicone rubber, comprising:

plasma treating a surface of a first silicone rubber sheet and a surface of a second silicone rubber sheet using carbon dioxide ($CO_2$) as a reaction gas at 1 atm and at a plasma temperature of less than 300° C., wherein the $CO_2$ is supplied at 1 L/Wh to 3 L/Wh, and wherein an output of the plasma is 0.15 WATT/$mm^2$ to 0.5 WATT/$mm^2$; and directly bonding the plasma treated surfaces of the first and second silicone rubber sheets to each other by compression at a pressure of from 0.1 kg/$cm^2$ to about 1 kg/$cm^2$ for 1 to 60 seconds, wherein no adhesive agent is applied between the plasma treated surfaces of the first and second silicone rubber sheets.

7. The method of claim 6, wherein the first and second silicone rubber sheets have a thickness of 0.1 μm to 150 mm.

8. The method of claim 6, wherein a discharge frequency of the plasma is 1 khz to 27.12 Mhz.

9. The method of claim 6, wherein the plasma treatment has an interval of 1 mm to 50 mm.

10. The method of claim 6, wherein the plasma treated surface of the first silicone rubber sheet is surface-modified and has a surface energy against water that is 10 mN/m to 60 mN/m higher than the surface energy against water before the plasma treatment.

* * * * *